J. SCHNITZER.

Photographic Lens.

No. 49,160.

Patented Aug. 1, 1865.

UNITED STATES PATENT OFFICE.

JOSEPH SCHNITZER, OF NEW YORK, N. Y.

IMPROVEMENT IN PHOTOGRAPHIC LENSES.

Specification forming part of Letters Patent No. 49,160, dated August 1, 1865.

*To all whom it may concern:*

Be it known that I, JOSEPH SCHNITZER, of the city, county, and State of New York, have invented a new and Improved Photographic Lens; and I do hereby declare that the following is a full, clear, and exact description thereof, which will enable those skilled in the art to make and use the same, reference being had to the accompanying drawings, forming part of this specification, in which—

Figure 1:
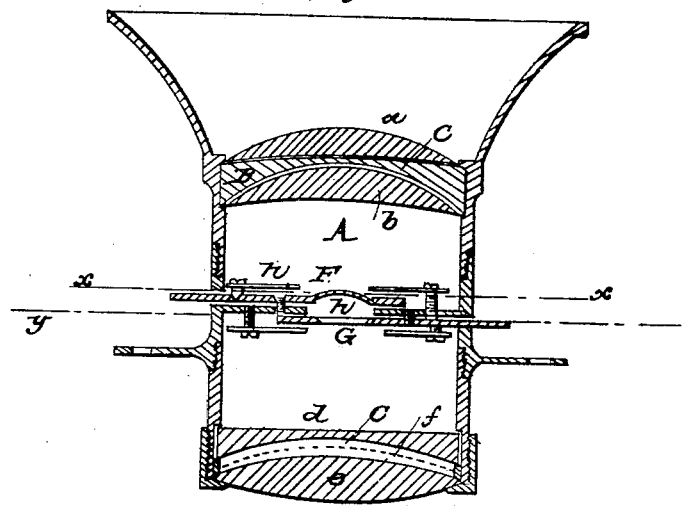
Figure 2:
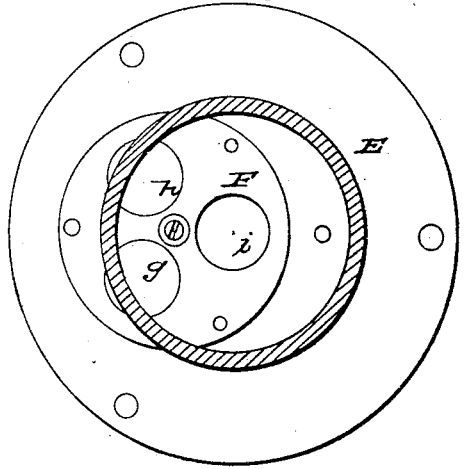
Figure 3:
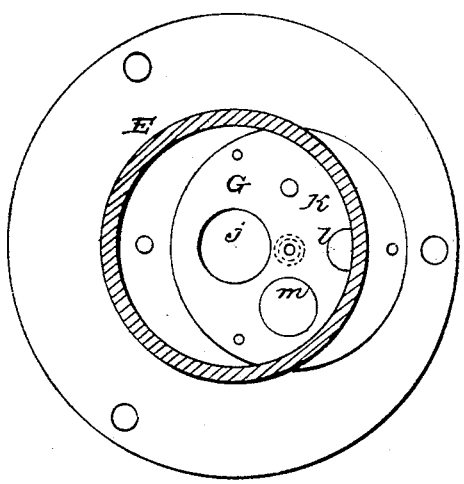

Figure 1 represents a longitudinal central section of this invention. Fig. 2 is a horizontal section of the same in the plane indicated by the line $x\,x$, Fig. 1. Fig. 3 is a similar section of the same, the plane of section being indicated by the line $y\,y$, Fig. 1.

Similar letters of reference indicate corresponding parts.

The object of this invention is a photographic lens which combines with a short focus an angle of eighty degrees, more or less, and which is so arranged that its focus can be adjusted and that the same instrument can be used for pictures of different size.

The lens A is composed of a triplet front lens, B, and doublet back lens, C. The front lens is constructed of two pieces of crown-glass and one of flint-glass. The two crown-glasses $a\,b$ are meniscus-shaped, and the flint-glass $c$ fits with one surface to the concave side of the first crown-glass and with its other concave side to the convex side of the second crown-glass, as shown in Fig. 1 of the drawings. The several glasses are cemented together in the usual manner.

The correcting back lens, C, of the instrument is made of a negative flint-glass, $d$, and a double-convex crown-glass lens, $e$. The first surface of the flint-glass $d$ next the front lens is slightly concave, and the other surface is also concave, but with a much shorter radius than the first. The crown-glass lens $e$ has two convex sides with different radii, the side with the longest radius being turned inside, and the other side with the shortest radius being outside.

The outside surface of the front lens is of a shorter radius than the outside surface of the back lens.

The two glasses $d\,e$ of the back lens are separated by a ring, $f$, which represents a correcting-distance, but which is not absolutely necessary. The radii of the flint-glass surface facing the crown-glass $e$, and of the crown-glass surface facing the flint-glass $d$, are different, the radius of the flint-glass surface being the shorter.

The two lenses B C are separated from each other by the center piece, E, which is arranged about in the middle between both outside glass surfaces of the instrument. It consists of two revolving disks, F G, each with holes of different sizes. The disk F, facing the front lens, is furnished with three holes, $g\,h\,i$, two of which are filled with glasses, both of the same shape, but unequal negative focal length. Their form is convex-concave, the convex side being turned against the front lens.

The rotary diaphragm G has four holes, $j\,k\,l\,m$, of different diameters corresponding with the optical axis of the instrument. Both these rotary disks are so arranged that they can be easily handled from the outside of the instrument, and they are provided with small spring-catches, $n$, to keep them true in the axis of the instrument.

By the lenses $h\,i$ in the disk F the focus of the instrument can be changed and pictures of different size can be produced with the same instrument.

My new instrument is adapted for a portrait apparatus as well as for a view-lens. It has an angle of eighty degrees (more than any instrument known to me, with the exception of my globe lens,) and it has a short focus, so that the photographer is enabled to work in a small room. The picture or portrait can be made large or small, as may be desired. For groups my instrument will be particularly fine. Its great depth enables a person to select a position without the aid of the photographer.

The lenses in the disk F render my instrument particularly fit for views of landscapes, &c. By turning said disk pictures of three different sizes can be produced. When the free hole $g$ is in the center the focus is shortest. By turning the first lens, $h$, in the center the focus is lengthened, and by the negative property of this lens the field for the lengthened focus is corrected. The second lens, $i$, has the same property, but the focus of the instrument is still further lengthened. The difference between the in and out side radii of these negative lenses is so little that it does not interfere with the achromatism, and for this reason single lenses can be employed. If desired, the number of lenses in the disk F can be still further increased.

I claim as new and desire to secure by Letters Patent—

1. A lens, A, constructed of a triplet front lens, B, and doublet back lens, C, substanstantially as herein set forth.

2. The correcting-lenses $h\ i$ in the disk F, or its equivalent, applied in combination with a lens, A, substantially as and for the purpose specified.

3. The disk F, or its equivalent, furnished with one or more correcting-lenses, $h\ i$, in combination with the diaphragm G and lens A, constructed and operating substantially as and for the purpose described.

JOS. SCHNITZER.

Witnesses:
M. M. LIVINGSTON,
W. HAUFF.